(12) United States Patent
Park et al.

(10) Patent No.: US 10,377,270 B2
(45) Date of Patent: Aug. 13, 2019

(54) SEAT POSITION ADJUSTMENT APPARATUS FOR VEHICLE

(71) Applicants: Hyundai Motor Company, Seoul (KR); Kia Motors Corporation, Seoul (KR); Dae Won San Up Co., Ltd., Ansan-si (KR)

(72) Inventors: Il Hong Park, Yongin-si (KR); Eun Sue Kim, Ansan-si (KR); Dae Ig Jung, Suwon-si (KR); Keun Sig Lim, Yongin-si (KR); Byoung Su You, Siheung-si (KR); Jong Ho Lim, Suwon-si (KR); Sang Yong Koo, Incheon (KR); Sun Ho Hur, Seoul (KR); Dong Hwi Kim, Ansan-si (KR); Young Cheol Jang, Ansan-si (KR); Tae Hyung Kim, Siheung-si (KR)

(73) Assignees: Hyundai Motor Company, Seoul (KR); Kia Motors Corporation, Seoul (KR); Dae Won San Up Co., Ltd., Ansan-si (KR)

( * ) Notice: Subject to any disclaimer, the term of this patent is extended or adjusted under 35 U.S.C. 154(b) by 0 days.

(21) Appl. No.: 15/802,742

(22) Filed: Nov. 3, 2017

(65) Prior Publication Data
US 2018/0272896 A1 Sep. 27, 2018

(30) Foreign Application Priority Data
Mar. 23, 2017 (KR) .......................... 10-2017-0037084

(51) Int. Cl.
*B60N 2/07* (2006.01)
*B60N 2/90* (2018.01)
(Continued)

(52) U.S. Cl.
CPC ............. *B60N 2/07* (2013.01); *B60N 2/0232* (2013.01); *B60N 2/12* (2013.01); *B60N 2/995* (2018.02)

(58) Field of Classification Search
CPC . B60N 2/07; B60N 2/995; B60N 2/12; B60N 2/0232
(Continued)

(56) References Cited

U.S. PATENT DOCUMENTS 6,170,786 B1  1/2001  Park
6,375,119 B2  4/2002  Park
(Continued)

FOREIGN PATENT DOCUMENTS

KR  10-2005-0036555 A  4/2005

*Primary Examiner* — Justin V Lewis
(74) *Attorney, Agent, or Firm* — Morgan, Lewis & Bockius LLP

(57) ABSTRACT

A seat position adjustment apparatus for a vehicle may include fixed rails fixed on a bottom plane; first sliding rails configured to slide in forward and backward directions on the fixed rails respectively, and provided with cushion links rotatably coupled to the cushion frame; second sliding rails configured to move with the first sliding rails and slide on and protrude from the first sliding rails, and formed to support the cushion frame with the cushion links; a driving device mounted to the first sliding rails or the second sliding rails and configured to transmit power to the first sliding rails and the second sliding rails; and a seat back link rotatably mounted on the bottom plane or the fixed rails and rotatably coupled to and supporting a seat back frame.

9 Claims, 10 Drawing Sheets

(51) Int. Cl.
*B60N 2/12* (2006.01)
*B60N 2/02* (2006.01)

(58) Field of Classification Search
USPC .......... 297/1, 16.1, 118, 183.1, 183.2, 217.1
See application file for complete search history.

(56) References Cited

U.S. PATENT DOCUMENTS

| | | |
|---|---|---|
| 6,767,040 B1 | 7/2004 | Freijy |
| 6,929,320 B2 | 8/2005 | Laurent |
| 7,182,404 B2 | 2/2007 | Laurent |
| 7,401,857 B2 | 7/2008 | Laux |
| 7,472,957 B2 | 1/2009 | Ferry |
| 8,579,375 B2 | 11/2013 | Marais |
| 10,106,057 B2 | 10/2018 | Epaud |
| 2015/0375865 A1* | 12/2015 | Fischer .................. B60N 2/919 701/49 |
| 2016/0159256 A1 | 6/2016 | Szlag |
| 2017/0275003 A1 | 9/2017 | Erhel |
| 2017/0313209 A1 | 11/2017 | Yoshida |
| 2018/0272896 A1 | 9/2018 | Park |

* cited by examiner

SEAT POSITION ADJUSTMENT APPARATUS FOR VEHICLE

CROSS-REFERENCE(S) TO RELATED APPLICATIONS

The present application claims priority to Korean Patent Application No. 10-2017-0037084 filed on Mar. 23, 2017, the entire contents of which is incorporated herein for all purposes by this reference.

BACKGROUND OF THE INVENTION

Field of the Invention

The present invention relates to a seat position adjustment apparatus for a vehicle, more particularly, to a seat position adjustment apparatus wherein a seat cushion and a seat back can be adjusted to be fully horizontal so that convenience of the occupants is improved.

Description of Related Art

Generally, a passenger vehicle is provided with a seat on which an occupant is seated. Such a seat is divided into a seat back and a seat cushion, wherein the seat back is connected to the seat cushion through a reclining mechanism in a manner of tilting in forward and backward directions. Further, the seat back and the seat cushion are provided with a headrest and a leg rest, respectively, and these amenities are configured to be adjusted to fit with the shape of an occupant's body wherein a comfortable posture desired by the occupant is maintained.

Recently, as the amount of vehicle usage increases, the amount of time that an occupant spends in the vehicle becomes longer, and thus it is necessary to adjust a position of the seat to a state desired by the occupant. However, existing seats only perform functions including adjustments in height, tilting, and reclining. However, the functions of adjustment in height, tilting, and reclining alone cannot conform to a posture desired by an occupant.

That is, there is a drawback in that even when the occupant wants a posture of laying himself or herself down, and hence lay the seat back at the maximum reclined position, the seat back cannot be in a horizontal state in which the seat back is fully laid down due to the structural characteristic and limitations of the conventional reclining mechanism.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seat position adjustment apparatus for a vehicle wherein a seat back is adjusted to be completely laid down from a seat cushion.

In one aspect of the present invention for accomplishing the object as mentioned above, there is provided a seat position adjustment apparatus for a vehicle, disposed with a cushion frame and a back frame rotatably mounted to the cushion frame, wherein the apparatus may include fixed rails fixed on a bottom plane; first sliding rails configured to slide in forward and backward directions on the fixed rails respectively, and provided with respective cushion links rotatably coupled to the cushion frame; second sliding rails configured to move together with the first sliding rails and slide on and protrude from the first sliding rails, wherein the second sliding rails are formed to support the cushion frame together with the cushion links; a driving device mounted to the first sliding rails or the second sliding rails and configured to transmit power to the first sliding rails and the second sliding rails; and a seat back link rotatably mounted on the bottom plane or the fixed rails, and rotatably coupled to a seat back frame to support the seat back frame.

The cushion links are rotatably coupled to front end portions of the first sliding rails at the cushion link's one end portion and rotatably coupled at a rear end portion of the cushion frame at the cushion link's other end portion.

Front end portions of the second sliding rails are formed with a connection end portion bent and extending upwardly wherein the connection end portion is rotatably coupled to a front end portion of the cushion frame.

Lengths of the cushion links of the first sliding rails and the connection end portion of the second sliding rails are formed wherein the cushion frame can be maintained horizontal when the first sliding rails and the second sliding rails are slid and moved by operation of the driving device.

One end portion of the seat back link is rotatably mounted on the bottom plane at the rear side of the fixed rails and the other end portion thereof is rotatably coupled to the seat back frame, wherein a length of the seat back link is formed wherein the seat back link is laid down horizontally together with the cushion frame when the first sliding rails and the second sliding rails are slid and moved by operation of the driving device.

Each of the first sliding rails further includes a first guide screw mounted on the bottom plane and extending in forward and backward directions thereof. The driving device includes a motor mounted to the first sliding rails configured to move together with the first sliding rails, and a screw rod extending from the motor and connected to the first guide screws.

Each of the second sliding rails further includes a second guide screw extending along the longitudinal direction of the first sliding rail and connected to the screw rod of the driving device.

The fixed rails are configured to be symmetrically paired, the first sliding rails are configured to be paired to be disposed on the pair of fixed rails, the pair of first sliding rails may be connected to each other by a stepped mounting member extending in a mutual opposite direction of the first sliding rails, and the motor of the driving device is mounted at the stepped mounting member.

The second sliding rails are configured to be paired to be disposed on the pair of first sliding rails wherein the pair of first sliding rails is connected by the connection end portion extending in a mutual opposite direction of the first sliding rails at the front end portion of the first sliding rails.

According to the seat position adjustment apparatus for a vehicle, as configured above, the seat back can be adjusted to be completely laid down from the seat cushion wherein an occupant seated on the seat is provided with a lying posture, improving the convenience of the occupant.

Further, since the position of the seat can be adjusted by a single motor, manufacturing cost is minimized.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
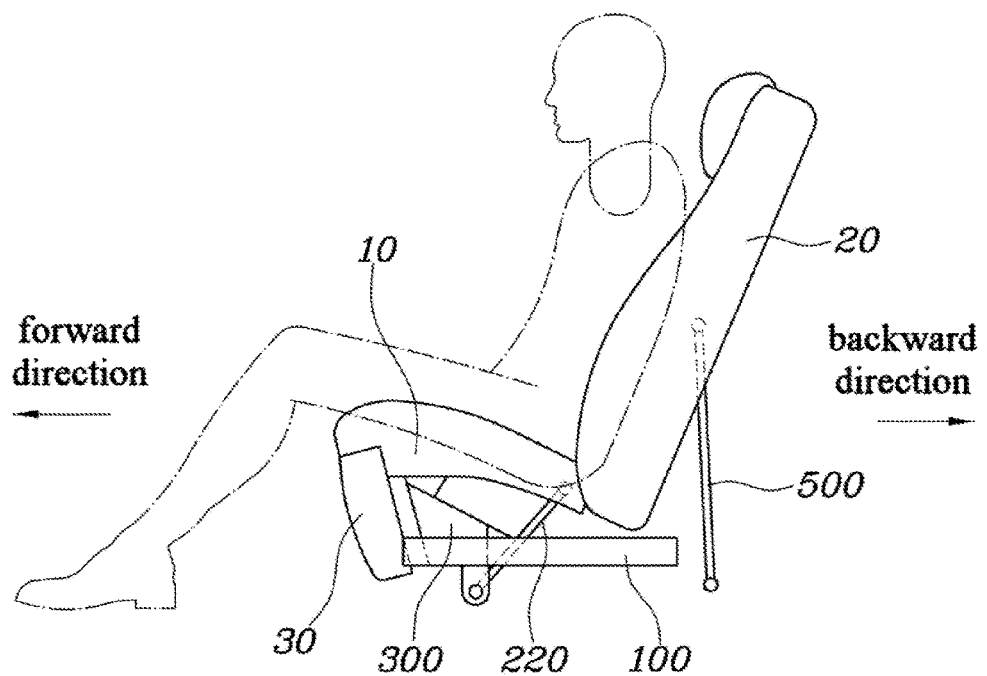
FIG. 1, FIG. 2, and FIG. 3 are views showing a seat position adjustment apparatus for a vehicle according to an exemplary embodiment of the present invention and its operational states.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
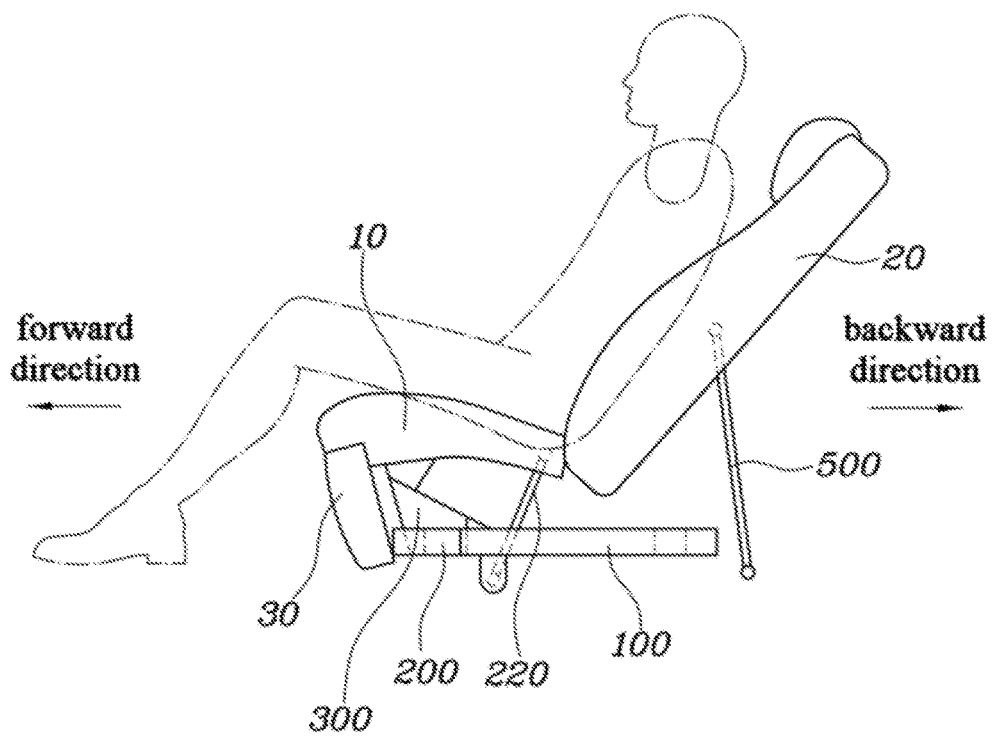
Figure 3:
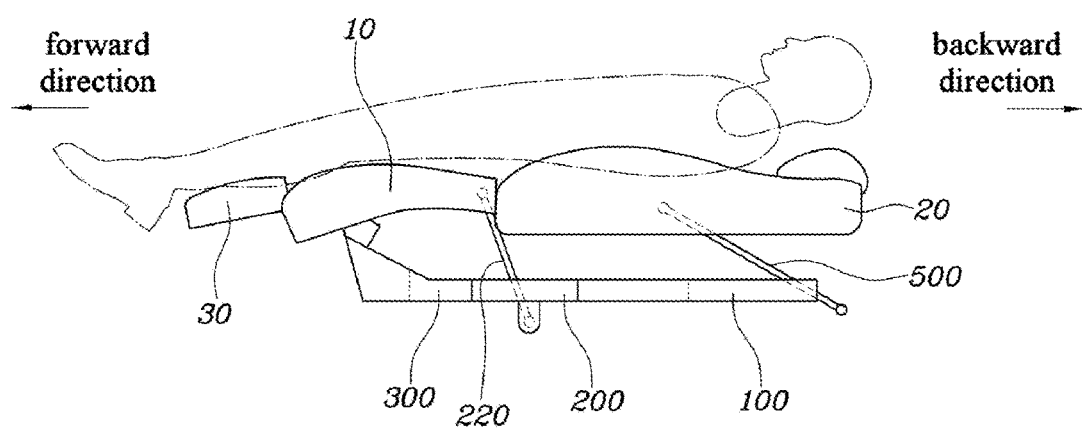
Figure 4:
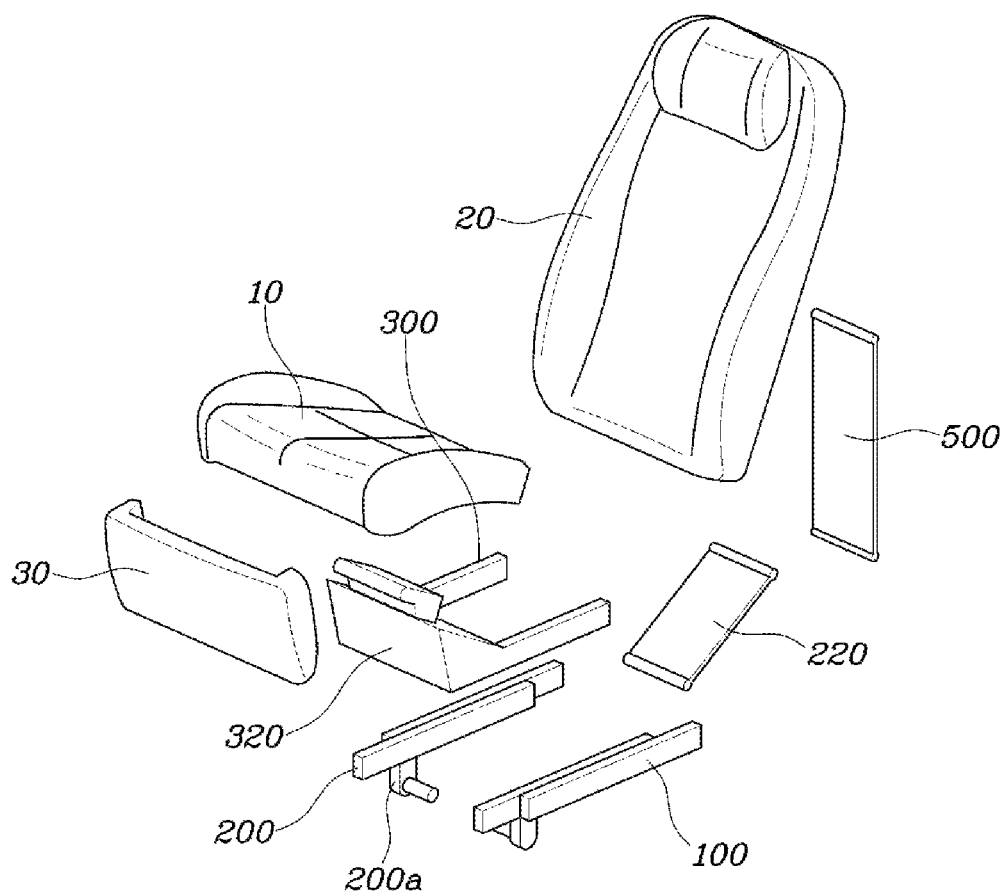
FIG. 4 is an exploded view of the seat position adjustment apparatus for a vehicle as shown in FIG. 1.

FIG. 1 to FIG. 3 are views showing a seat position adjustment apparatus for a vehicle according to an exemplary embodiment of the present invention and its operation states, FIG. 4 is an exploded view of the seat position adjustment apparatus for a vehicle as shown in FIG. 1, and FIG. 5, FIG. 6, FIG. 7, FIG. 8, FIG. 9 and FIG. 10 are views for illustrating the seat position adjustment apparatus for a vehicle as shown in FIG. 1.

A seat according to an exemplary embodiment of the present invention includes a cushion frame 10 and a seat back frame 20 rotatably mounted to the cushion frame 10, wherein a rear end portion of the cushion frame 10 and a lower end portion of the seat back frame 20 may be rotatably coupled to each other through a free stop hinge, or may be connected to each other in such a manner of reclining wherein the seat back frame 20 is angularly adjusted with respect to the cushion frame 10.

As shown in FIG. 1, FIG. 2, FIG. 3, and FIG. 4, the seat position adjustment apparatus for a vehicle according to an exemplary embodiment of the present invention may include fixed rails 100 fixed on a bottom plane B; first sliding rails 200 configured to slide in forward and backward directions on the fixed rails 100 respectively, and provided with respective cushion links 220 rotatably coupled to the cushion frame 10; second sliding rails 300 configured to move together with the first sliding rails 200 and slide on and protrude from the first sliding rails 200, wherein the second sliding rails 300 are formed to support the cushion frame 10 together with the cushion links 220; a driving device 400 mounted to the first sliding rails 200 or the second sliding rails 300 and configured to transmit power to the first sliding rails 200 and the second sliding rails 300; and a seat back link 500 rotatably mounted on the bottom plane B or the fixed rails 100 and rotatably coupled to the seat back frame 20 to support the seat back frame 20.

Figure 7:
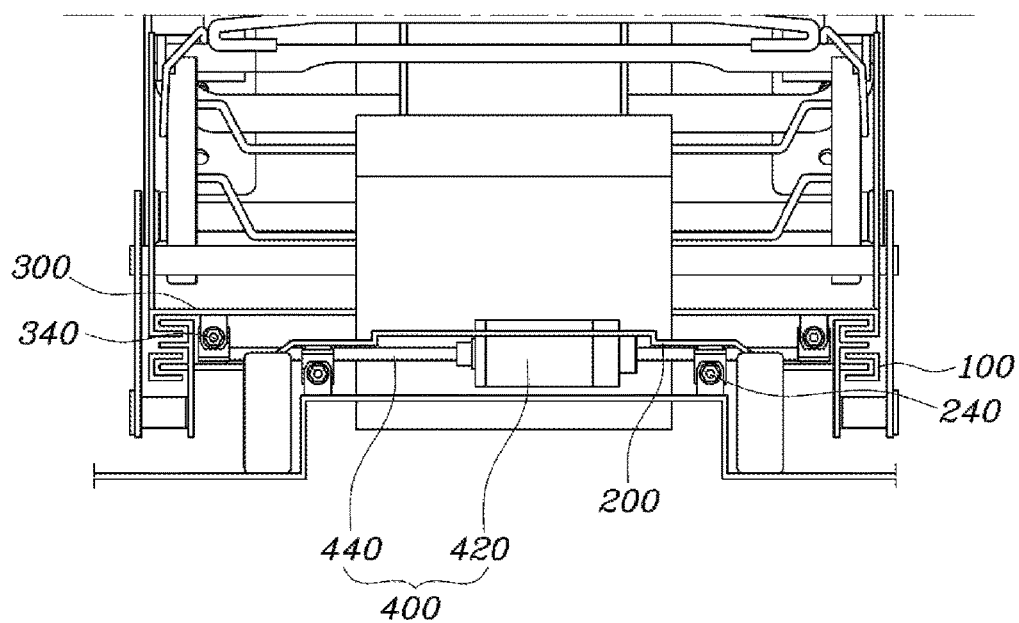

That is, the present invention includes fixed rails 100, first sliding rails 200, second sliding rails 300, a driving device 400, and seat back links 500. In the present case, the fixed rails 100 are fixed on the bottom plane B and configured to extend in forward and backward directions while allowing the first sliding rails 200 to be connected thereto in a manner of sliding along the extended direction thereof. A structure for a slidable connection between the fixed rails 100 and the first sliding rails 200 may be configured in the same manner as a structure generally applied to rails for a seat. For example, as can be seen in FIG. 7, each of the fixed rails 100 is formed in a '⊂'-shape so that the first sliding rails 200 can slide on the fixed rails 100, while each of the first sliding rails 200 may be formed in a 'Ǝ'-shape so that it is not only connected to the fixed rail 100 but also to the second sliding rail 300. In the present case, each of the second sliding rails 300 may be formed with an end portion of '⊂'-shape wherein it can be connected to the first sliding rail 200. In the present way, the fixed rails 100, the first sliding rails 200, and the second sliding rails 300 are slidably coupled to each other and configured to have a roller structure at the connected portion to allow for a smooth sliding operation.

Each of the first sliding rails 200 are provided with a cushion link 220 rotatably coupled to the cushion frame 10 while each of the second sliding rails 300 are configured to slide along a longitudinal direction of the first sliding rail 200 and rotatably coupled to the cushion frame 10. As a result, the cushion frame 10 is supported by the cushion links 220 disposed respectively at the first sliding rails 200 and the second sliding rails 300, and a position of the cushion frame 10 can be moved as the first sliding rails 200 and the second sliding rails 300 are moved.

As the first sliding rails 200 and the second sliding rails 300 are moved by receiving power from the driving device 400, and the second sliding rails 300 are mounted on the first sliding rails 200 respectively, the first sliding rails 200 are slid forward on the fixed rails 100 and the second sliding rails 300 are moved forward on the first sliding rails 200 when the driving device 400 operates. In turn the second sliding rails 300 protrude from the first sliding rails 200. By the present operation, the cushion frame 10 can be moved forward thereof.

The seat back link 500 is rotatably mounted to the bottom plane B or the fixed rails 100 and rotatably coupled to the back frame 20 supporting the back frame 20, so that when the back frame 20 is moved to follow the cushion frame 10 moving forward and then to be laid down as the driving device 400 operates, the back frame's 20 position, whose angle is stably adjusted, can be fixed by the seat back link 500 supporting the back frame 20.

By the above case, although the seat cushion and the seat back are in a normal state of allowing an occupant to sit thereon, as shown in FIG. 1, when an occupant wants to lie down operation of spreading the seat cushion and the seat back horizontally can be performed, as shown in FIG. 3.

Figure 5:
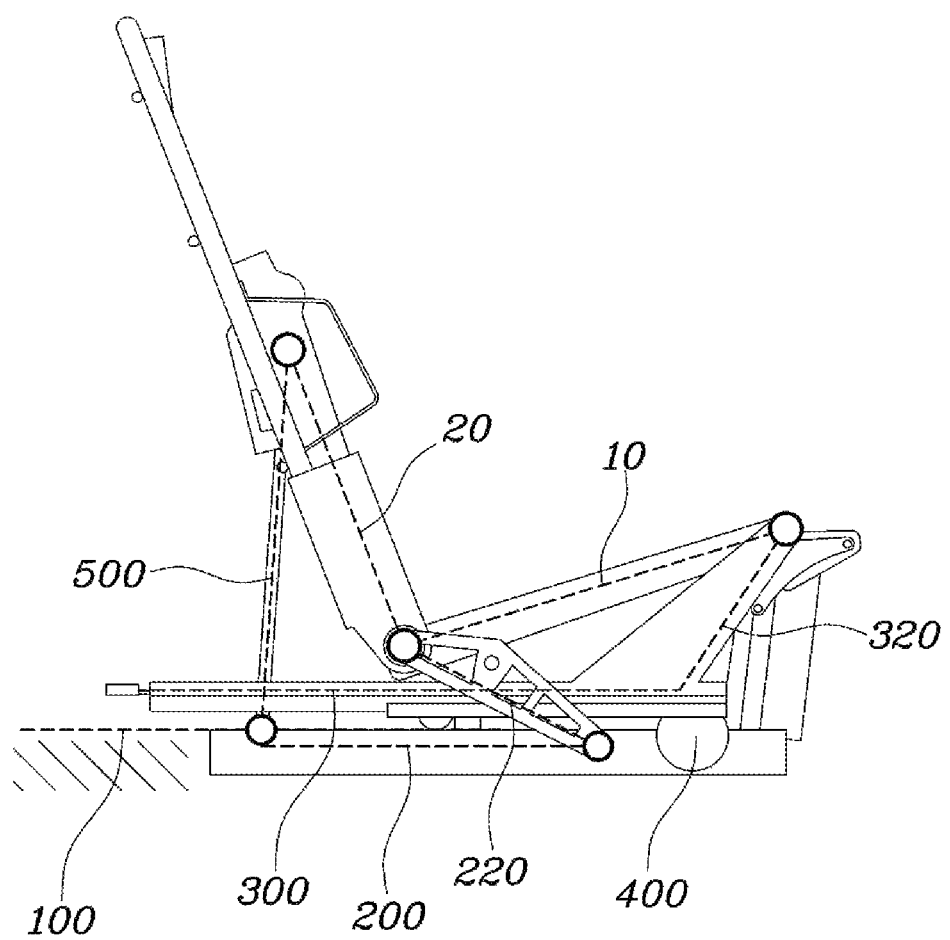
FIG. 5, FIG. 6, FIG. 7, FIG. 8, FIG. 9, and FIG. 10 are views for illustrating the seat position adjustment apparatus for a vehicle as shown in FIG. 1.

Specifically explaining the present invention as described above, the cushion links 220 are rotatably coupled to front end portions of the first sliding rails 200 at the cushion link's one end portion and rotatably coupled to a rear end portion of the cushion frame 10 at the cushion link's other end portion, as shown in FIG. 5.

Further, the front end portion of the second sliding rails 300 are formed with a connection end portion 320 bent and extending upwardly wherein the connection end portion 320 may be rotatably coupled to the front end portion of the cushion frame 10.

In the present case, when connecting to the first sliding rails 200 and the cushion frame 10, the cushion links 220 may be hinged thereto. The connection end portion 320 of the second sliding rails 300 may also be hinged to and rotatably coupled to the cushion frame 10. The cushion links 220 disposed on the first sliding rails 200 are connected to a rear end portion of the cushion frame 10, and the connection end portion 320 formed on the second sliding rails 300 is connected to a front end portion of the cushion frame 10 so that the cushion frame 10 is stably supported and can be moved according to the movement of the first sliding rails 200 and the second sliding rails 300 when the driving device 400 operates.

Further, as can be seen in FIG. 4, since the cushion links 220 must support the weight of the occupant in addition to the weight of the components of the seat cushion, each of the cushion links 220 may be formed in a plate shape, and the connection end portion 320 may also formed in a plate shape wherein sufficient rigidity for supporting the cushion frame 10 is secured.

The first sliding rails 200 may be formed respectively with protrusions 200a to allow the cushion links 220 to be mounted below the front end portion of the first sliding rails 200 so that the cushion links 220, in a form of a plate, are rotatably hinged to the protrusions thereof. The connection end portion 320 of the second sliding rails 300 may be provided with a leg rest 30. The connection end portion 320 may also be provided with a reinforcing portion 300a extending in a diagonal direction toward the second sliding rails 300 at an extended end portion of the connection end portion 320 wherein the connection end portion 320 can support a load including the leg rest 30.

Meanwhile, the lengths of the cushion links 220 of the first sliding rails 200 and the connection end portion 320 of the second sliding rails 300 are formed wherein the cushion frame 10 can be maintained horizontally when the first sliding rails 200 and the second sliding rails 300 are slid and moved by operation of the driving device 400.

Figure 6:
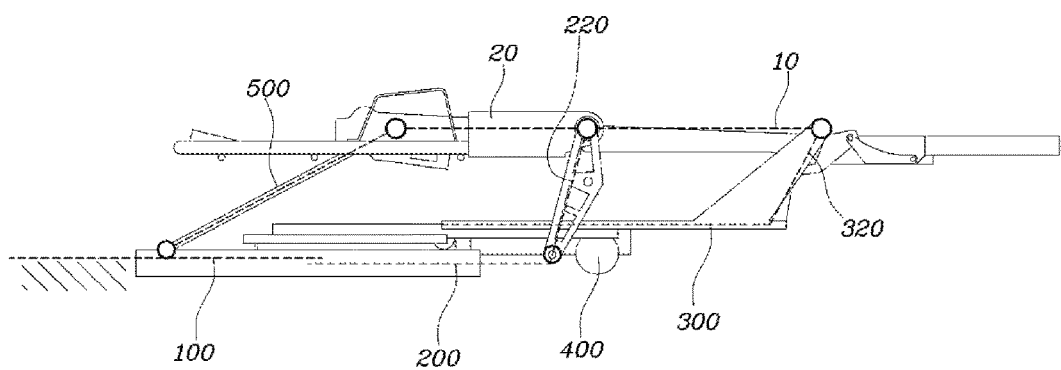

That is, as can be seen in FIG. 3 and FIG. 6, for the occupant to maintain a comfortable lying posture, the cushion frame 10 may be kept horizontal when the first sliding rails 200 and the second sliding rails 300 are slid and moved by operation of the driving device 400. Therefore, by configuring the length of the cushion links 220 of the first sliding rails 200 and the extended length of the connection end portion 320 of the second sliding rails 300 to be equal to each other, or by configuring the length of the connection end portion 320 to be longer than that of the cushion link 220, the cushion frame 10 connected to the cushion links 220 and the connection end portion 320 can be maintained horizontally when the first sliding rails 200 and the second sliding rails 300 are slid and moved.

Meanwhile, one end portion of the seat back link 500 is rotatably mounted on the bottom plane B at the rear side of the fixed rails 100 and the other end portion thereof is rotatably coupled to the seat back frame 20 wherein a length of the seat back link 500 may be formed so that the seat back link 500 is laid down horizontally together with the cushion frame 10 when the first sliding rails 200 and the second sliding rails 300 are slid and moved by operation of the driving device 400.

In the present case, the seat back link 500 may be hinged to the bottom plane B and the seat back frame 20 so that the seat back link 500 is rotatably coupled to the bottom plane B and the seat back frame 20. The seat back link 500 may be formed in a plate shape to sufficiently support the weight of the seat back and the occupant, and its length may be formed wherein the seat back link 500 is laid down horizontally together with the moved cushion frame 10 when the first sliding rails 200 and the second sliding rails 300 are slid and moved as the driving device 400 operates. To allow the seat back to be converted from an initially erect state to a horizontally laid down state together with the seat cushion, the seat back link 500 is configured wherein the position the seat back link 500 is mounted on the bottom plane B as well as the length thereof can be adjusted.

Figure 8:
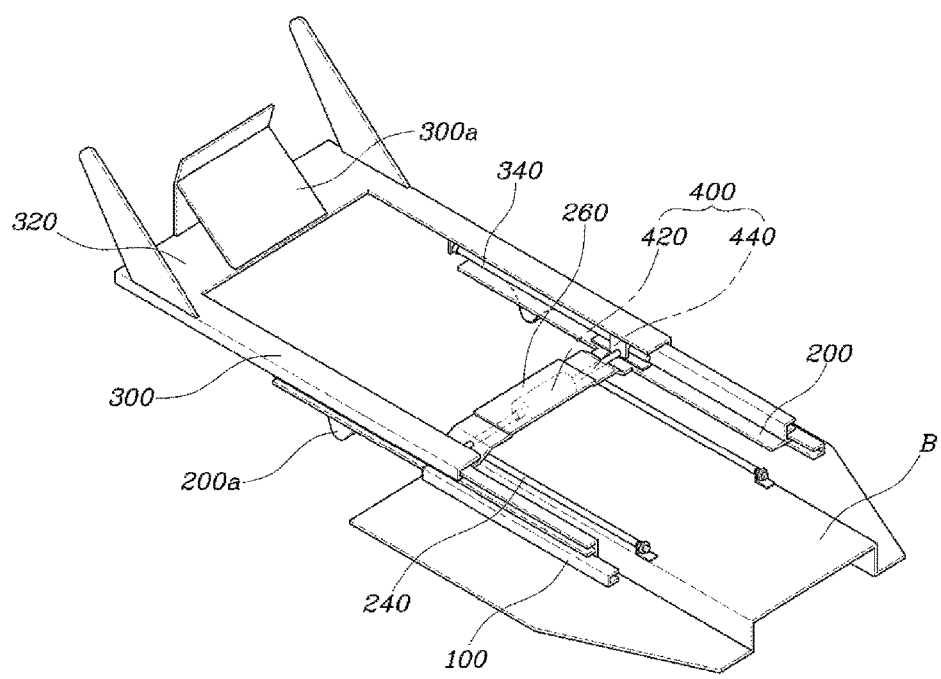
Figure 9:
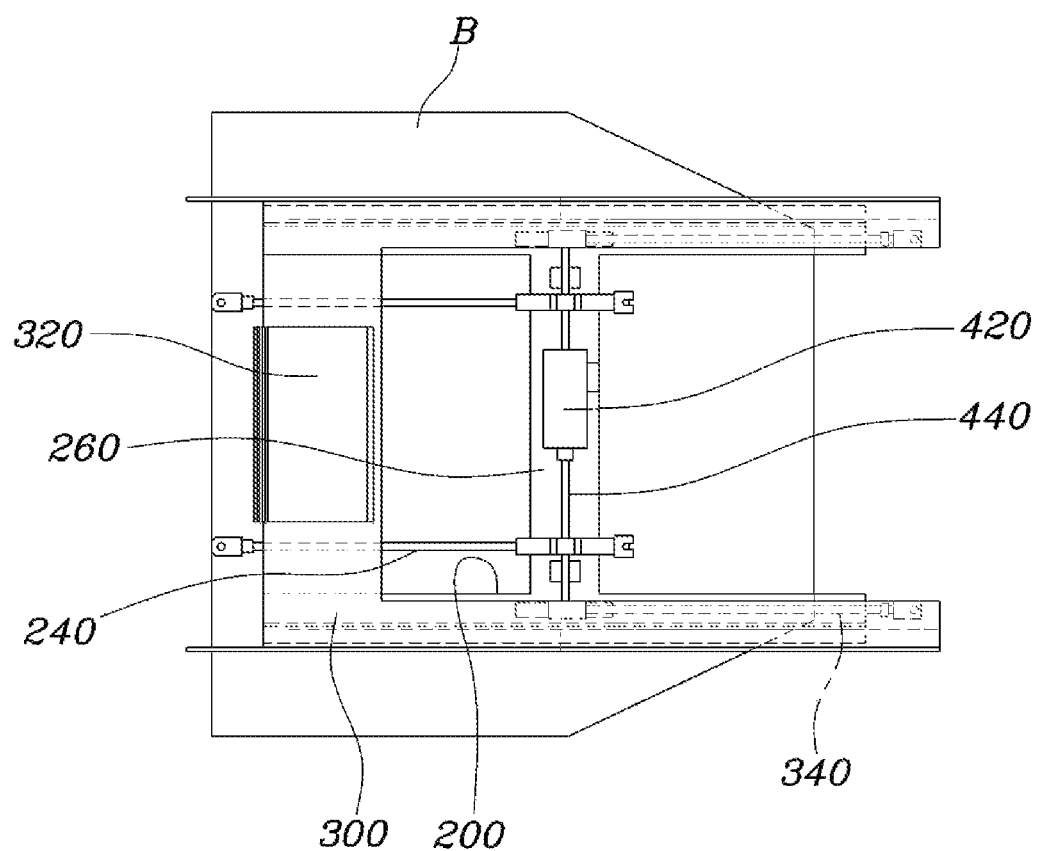

On the other hand, as shown in FIG. 7, FIG. 8, and FIG. 9, each of the first sliding rails 200 further includes a first guide screw 240 mounted on the bottom plane B and extending in forward and backward directions, and the driving device 400 includes a motor 420 mounted to the first sliding rails 200 and configured to move together with the first sliding rails 200 and a screw rod 440 extending from the motor 420 and connected to the first guide screws 240.

That is, the first guide screws 240, formed to extend in forward and backward directions of the seat, are fixedly mounted on the bottom plane B, the motor 420 of the driving device 400 is mounted to the first sliding rails 200, and the screw rod 440 extending from the motor 420 is connected to the first guide screws 240, so that as the screw rod 440 rotates during operation of the motor 420, the screw rod 440 moves along the extended direction of the first guide screws 240, and in turn the motor 420 and the first sliding rails 200 connected to the screw rod 440 are moved in forward and backward directions.

In the present case, since the first guide screws 240 and the screw rod 440 are coupled with each other, they can be moved along a thread when rotation occurs. In addition, since the first guide screws 240 are fixed to the bottom plane B, the first sliding rails 200 are dragged and moved by the screw rod 440.

On the other hand, as shown in FIG. 8 and FIG. 9, each of the second sliding rails 300 further includes a second guide screw 340 extending along the longitudinal direction of the first sliding rail 200 and connected to the screw rod 440 of the driving device 400.

That is, the second guide screws 340, which are formed to extend along the longitudinal direction of the first sliding rails 200, are fixedly mounted to the second sliding rails 300, and the screw rod 440 extending from the motor 420 is connected to the second sliding rails 300, so that as the screw rod 440 rotates during operation of the motor 420, the second guide screws 340 can be moved in a direction to be extended by receiving a rotational force of the screw rod 440. As a result, the second sliding rails 300 are moved together with the second guide screws 340.

In the present case, the second guide screws 340 are also formed with threads and coupled with the screw rod 440 so that the second guide screws 340 receives a rotational force from the screw rod 440 during a rotation of the screw rod 440, and drags and moves the second sliding rails 300.

As described above, according to an exemplary embodiment of the present invention, since the screw rod 440 extending from a single motor 420 is coupled with both the first guide screws 240 for moving the first sliding rails 200 and the second guide screw 340 for moving the second sliding rails 300, the first sliding rails 200 and the second sliding rails 300 can be simultaneously moved by a single motor 420 alone. As a result, the distance that the first sliding rails 200 are moved on the fixed rails 100 when the motor 420 of the driving device 400 operates is equal to the distance that the second sliding rails 300 are moved while protruding from the first sliding rails 200.

The fixed rails 100 may be configured to be symmetrically paired, the first sliding rails 200 may be configured to be paired to be provided on the pair of fixed rails 100, the pair of first sliding rails 200 may be connected to each other by a stepped mounting member 260 extending in a mutual opposite direction of the rails, and the motor 420 of the driving device 400 may be mounted at the stepped mounting member 260.

Further, the second sliding rails 300 are configured to be paired to be provided on the pair of first sliding rails 200, wherein the pair of first sliding rails 200 can be connected by the connection end portion 320 extending in a mutual opposite direction of the first sliding rails 200 at the front end portions of the first sliding rails 200.

As rails for a seat are configured to be paired, the fixed rails 100, the first sliding rails 200, and the second sliding rail 300 according to an exemplary embodiment of the present invention are also configured to be paired respectively so that the seat can be slid in a manner of being balanced and stable. In the present case, as the pair of first sliding rails 200 are provided with the stepped mounting member 260 extending in the mutual opposite direction of the first sliding rails 200, the pair of first sliding rails 200 can be simultaneously slid and moved. In addition, as the motor 420 of the driving device 400 is mounted at the stepped mounting member 260, the driving device 400 can be moved together with the first sliding rails 200.

Further, as the second sliding rails 300 are also configured to be paired and integrally connected by the connection end portion 320 extending in the mutual opposite direction of the rails at the front end portion of the rails, they can be slid and moved on the first sliding rails 200.

Operation of the present invention as described above will be described below more.

As shown in FIG. 1, the state in which the seat back is erected from the seat cushion is maintained wherein the occupant is seated normally. At the present time, as shown in FIG. 1 and FIG. 5, the first sliding rails 200 and the second sliding rails 300 are disposed on the fixed rails 100 respectively so that an angle between the first sliding rails 200 and the cushion links 220 coupled to the rear end portion of the cushion frame 10 is maintained at a small angle of approximately 30°. Further, the seat back link 500 connected to the bottom plane B and the seat back frame 20 is also erected at an angle of approximately 90° from the bottom plane B, and supports the seat back frame 20 while the second sliding rails 300 are positioned on the first sliding rails 200 respectively as the driving device 400 is not operated, as shown in FIG. 9.

Figure 10:
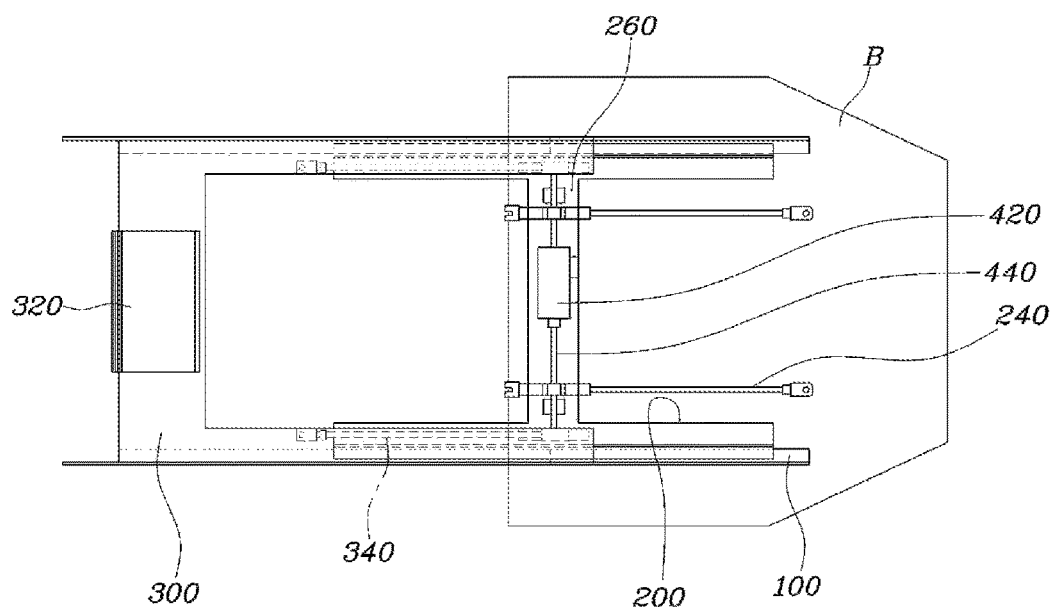

In the present state, when the motor 420 of the driving device 400 operate, the screw rod 440 is rotated by the rotational force of the motor 420, as shown in FIG. 10. As the screw rod 440 is rotated, the screw rod 440 moves in the longitudinal direction of the first guide screws 240 and simultaneously the second guide screws 340 receives the rotational force of the screw rod 440 and moves in the longitudinal direction of the screw rod 440. As a result, the first sliding rails 200, to which the driving device 400 is mounted on, slides on the fixed rails 100, and simultaneously the second sliding rails 300 receiving power from the driving device 400 moves on the first sliding rails 200.

That is, during operation of the driving device 400, by moving the first sliding rails 200 and the second sliding rails 300 as shown in FIG. 2 and FIG. 3, the cushion links 220 provided at the first sliding rails 200 and the connection end portion 320 formed at the second sliding rails 300 force the cushion frame 10 to move, and the lower end portion of the seat back frame 20 connected to the seat back link 500 also follows the cushion frame 10 and moves accordingly. As mentioned above, when the driving device 400 operates, the connection end portion 320 of the second sliding rails 300 drags and moves the front end portion of the cushion frame 10 and the cushion links 220 connected to the rear end portion of the cushion frame 10 and the seat back link 500 connected to the seat back frame 20 are rotated, with the result that the seat cushion and the seat back are spread horizontally as shown in FIG. 3 and FIG. 6.

In the present way, since the seat cushion and the seat back are spread horizontally, the occupant can lie on the seat. In addition, since the headrest connected to the seat back and the leg rest 30 connected to the seat cushion interact with each other and thus spread together horizontally, it is possible for the occupant to maintain the lying posture more comfortably.

According to the seat position adjustment apparatus for a vehicle, as configured above, the seat back can be adjusted to be completely laid down from the seat cushion wherein an occupant seated on the seat is provided with a lying posture, improving the convenience of the occupant.

Further, since the position of the seat can be adjusted by a single motor, manufacturing cost is minimized.

For conveyance in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat position adjustment apparatus for a vehicle, provided with a cushion frame and a back frame rotatably mounted to the cushion frame, wherein the apparatus comprises:
fixed rails fixed on a bottom plane;
first sliding rails configured to slide in forward and backward directions on the fixed rails respectively;
cushion links having a first end pivotally connected to the first sliding rails and a second end pivotally connected to the cushion frame;
second sliding rails slidably mounted on the first sliding rails and configured to move together with the first sliding rails and slide on and protrude from the first sliding rails and formed to support the cushion frame;

a driving device mounted to the first sliding rails or the second sliding rails and configured to transmit power to the first sliding rails and the second sliding rails; and a seat back link rotatably mounted on the bottom plane or the fixed rails and rotatably coupled to a seat back frame to support the seat back frame, wherein the fixed rails, the first sliding rails, and the second sliding rails are slidably coupled to each other.

2. The seat position adjustment apparatus of claim 1, wherein the cushion links are rotatable coupled to a front end portion of the first sliding rails at a first end portion of the cushion link and rotatably connected at a rear end portion of the cushion frame at a second end portion of the cushion link.

3. The seat position adjustment apparatus of claim 1, wherein front end portions of the second sliding rails are formed with a connection end portion bent and extending upwardly and wherein the connection end portion is rotatably coupled to a front end portion of the cushion frame.

4. The seat position adjustment apparatus of claim 3, wherein lengths of the cushion links of the first sliding rails and the connection end portion of the second sliding rails are formed such that the cushion frame is maintained horizontally when the first sliding rails and the second sliding rails are slid and moved by operation of the driving device.

5. The seat position adjustment apparatus of claim 1, wherein a first end portion of the seat back link is rotatably mounted on the bottom plane at a rear side of the fixed rails and a second end portion thereof is rotatably coupled to the seat back frame, and wherein a length of the seat back link is formed such that the seat back link is laid down horizontally together with the cushion frame when the first sliding rails and the second sliding rails are slid and moved by operation of the driving device.

6. The seat position adjustment apparatus of claim 1, wherein each of the first sliding rails further includes a first guide screw mounted on the bottom plane and extending in forward and backward directions of the first sliding rails, and the driving device includes a motor mounted to the first sliding rails to move together with the first sliding rails and a screw rod extending from the motor and connected to the first guide screw.

7. The seat position adjustment apparatus of claim 6, wherein each of the second sliding rails further includes a second guide screw extending along a longitudinal direction of the first sliding rail and connected to the screw rod of the driving device.

8. The seat position adjustment apparatus of claim 6, wherein the fixed rails are configured to be symmetrically paired, the first sliding rails are configured to be paired to be provided on the pair of fixed rails, the pair of first sliding rails are connected to each other by a stepped mounting member extending in a mutual opposite direction of the first sliding rails, and the motor of the driving device is mounted at the stepped mounting member.

9. The seat position adjustment apparatus of claim 8, wherein the second sliding rails are configured to be paired to be provided on the pair of first sliding rails and wherein the pair of first sliding rails are connected by the connection end portion extended in a mutual opposite direction of the first sliding rails at the front end portions of the first sliding rails.

* * * * *